US010563099B2

(12) United States Patent
Chen et al.

(10) Patent No.: US 10,563,099 B2
(45) Date of Patent: Feb. 18, 2020

(54) HOT MELT ADHESIVE COMPOSITION INCLUDING A CRYSTALLINE BLOCK COMPOSITE

(71) Applicant: Dow Global Technologies LLC, Midland, MI (US)

(72) Inventors: Liwen Chen, Philadelphia, PA (US); Colin Li Pi Shan, Pearland, TX (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 263 days.

(21) Appl. No.: 15/505,459

(22) PCT Filed: Aug. 21, 2014

(86) PCT No.: PCT/CN2014/084911
§ 371 (c)(1),
(2) Date: Feb. 21, 2017

(87) PCT Pub. No.: WO2016/026120
PCT Pub. Date: Feb. 25, 2016

(65) Prior Publication Data
US 2018/0355224 A1    Dec. 13, 2018

(51) Int. Cl.
*C09J 11/08* (2006.01)
*B32B 5/02* (2006.01)
(Continued)

(52) U.S. Cl.
CPC .............. *C09J 11/08* (2013.01); *B32B 5/022* (2013.01); *B32B 7/12* (2013.01); *B32B 21/13* (2013.01);
(Continued)

(58) Field of Classification Search
USPC .............. 525/88, 53, 65; 428/343, 348, 349, 428/355 R, 365, 368; 442/148–150
See application file for complete search history.

(56) References Cited

U.S. PATENT DOCUMENTS

| 7,732,052 B2 | 6/2010 | Chang et al. |
| 2008/0269412 A1 | 10/2008 | Carnahan et al. |

(Continued)

FOREIGN PATENT DOCUMENTS

| JP | 2006257247 A | 9/2006 |
| WO | 2011/163191 A1 | 12/2011 |

(Continued)

OTHER PUBLICATIONS

International Search Report and Written Opinion for PCT/CN2014/084911, 2015, pp. 1-9.

(Continued)

*Primary Examiner* — Lynda Salvatore

(57) ABSTRACT

A hot melt adhesive composition includes (A) 20-95 wt % of a polymer component including an ethylene-based polymer and a propylene based polymer, the ethylene-based polymer being present in an amount greater than 30 wt %, based on a total weight of the polymer component, and (B) 1-60 wt % of a crystalline block composite comprising (1) a crystalline ethylene based polymer, (2) a crystalline alpha-olefin based polymer derived from at least one of a C3-10 α olefin, and (3) a block copolymer comprising 10-90 wt % of a crystalline ethylene block comprising 90 or more wt % units derived from ethylene and comprising 10-90 wt % of a crystalline alpha-olefin block comprising 90 or more wt % units derived from at least one of a C3-10 α olefin, (C) Optionally, from greater than zero to 70 wt % tackifier, and (D) Optionally, from greater than zero to 40 wt % of at least one selected from the group of a wax and an oil.

14 Claims, 3 Drawing Sheets

(51) Int. Cl.
*B32B 7/12* (2006.01)
*B32B 21/13* (2006.01)
*C09J 5/06* (2006.01)
*C09J 123/06* (2006.01)
*C09J 123/12* (2006.01)

(52) U.S. Cl.
CPC ............... *C09J 5/06* (2013.01); *C09J 123/06* (2013.01); *C09J 123/12* (2013.01); *B32B 2255/26* (2013.01)

(56) References Cited

U.S. PATENT DOCUMENTS

| | | |
|---|---|---|
| 2011/0313106 A1 | 12/2011 | Shan et al. |
| 2011/0313107 A1 | 12/2011 | Shan et al. |
| 2011/0313108 A1 | 12/2011 | Shan et al. |

FOREIGN PATENT DOCUMENTS

| | | |
|---|---|---|
| WO | 2013/090396 A1 | 6/2013 |
| WO | 2013096068 A1 | 6/2013 |

OTHER PUBLICATIONS

International Preliminary Report on Patentability for PCT/CN2014/084911, 2017, pp. 1-5.

US 10,563,099 B2

HOT MELT ADHESIVE COMPOSITION INCLUDING A CRYSTALLINE BLOCK COMPOSITE

FIELD

Embodiments relates to hot melt adhesives (HMA) that include a crystalline block composite (CBC) compatibilizer.

BACKGROUND

Hot melt adhesives (HMA) based on high flow, low crystallinity polyethylene polymers, such as AFFINITY™ GA 1900 or 1950 have seen considerable growth over the last decade primarily due to their excellent benefits in processability, adhesive performance, and low cost. Despite this success there are niche applications where customers require better heat stress and cohesion, such as book binding applications and packaging applications, in which the adhesive experiences elevated temperatures during packaging, delivery and storage.

One approach to improving the cohesive properties of the HMA is to blend the polyethylene polymer with a propylene-based polymer such as VERSIFY™ 4200. However, polyethylene polymers and propylene-based polymers do not blend with one another particularly well (e.g., due to the inherent incompatibility of polyethylene and polypropylene polymers), and as such, produce a mixture that is less than desirable for HMA applications that require good adhesive properties under stress conditions, e.g., elevated temperatures. Accordingly, embodiments relate to a hot melt adhesive composition that has improved blending between an ethylene-based polymer and a propylene-based polymer.

SUMMARY

Embodiments may be realized by providing a hot melt adhesive composition that includes: (A) 20-95 wt % of a polymer component including an ethylene-based polymer and a propylene-based polymer, the ethylene-based polymer being present in an amount greater than 30 wt %, based on a total weight of the polymer component, and (B) 1-60 wt % of a crystalline block composite comprising (1) a crystalline ethylene based polymer, (2) a crystalline alpha-olefin based polymer derived from at least one of a $C_{3-10}$ α-olefin, and (3) a block copolymer comprising 10-90 wt % of a crystalline ethylene block comprising 90 or more wt % units derived from ethylene and comprising 10-90 wt % of a crystalline alpha-olefin block comprising 90 or more wt % units derived from at least one of a $C_{3-10}$ α-olefin, (C) Optionally, from greater than zero to 70 wt % tackifier, and (D) Optionally, from greater than zero to 40 wt % of at least one selected from the group of a wax and an oil.

DETAILED DESCRIPTION

Figure 1:
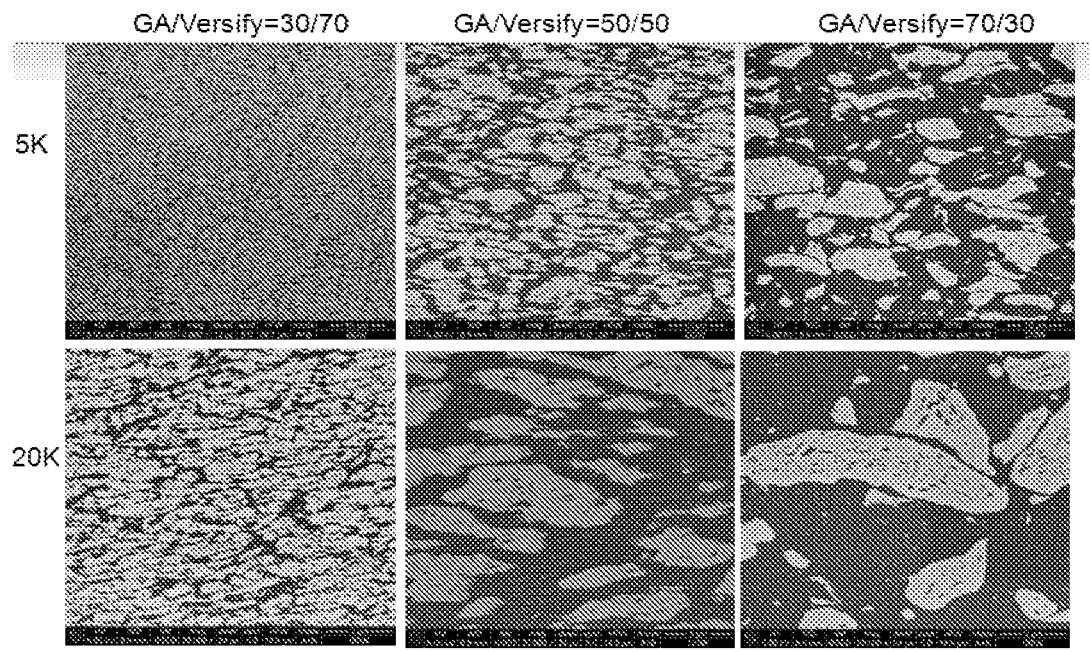
FIG. 1 is a set of six scanning electron microscope (SEM) images of the cross section of comparative examples including an ethylene-based polymer and propylene-based polymer blend in the absence of any crystalline block composite compatibilizer.

Embodiments relate a hot melt adhesive composition that includes a crystalline block composite (CBC) and a blend of an ethylene-based polymer and a propylene-based polymer. The hot melt adhesive composition may include a tackifier. The hot melt adhesive composition may include at least one selected from the group of oil and wax (i.e., may include oil and/or wax). For example, embodiments relate to hot-melt adhesive compositions for book binding applications and/or packaging applications.

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the density and melt index of components of the compositions.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

"Composition" and like terms mean a mixture or blend of two or more components. For example, in the context of preparing an HMA, a composition would include a random or homogeneous propylene-based interpolymer and a crystalline block composite (and optionally at least one tackifier and/or at least one wax and/or oil).

"Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Propylene-based polymer," and like terms mean a polymer that comprises a majority weight percent polymerized propylene monomer (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the amount of propylene is greater than 50 wt %, based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_{3-10}$ α olefin.

"Ethylene-based polymer" and like terms mean a polymer that comprises a majority weight percent polymerized ethylene monomer (based on the total weight of polymerizable monomers), and optionally may comprise at least one polymerized comonomer different from ethylene (such as at least one selected from a $C_{3-10}$ α olefin) so as to form an ethylene-based interpolymer. For example, with the ethylene-based polymer is a copolymer, the amount of ethylene is greater than 50 wt %, based on the total weight to the copolymer.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts (such as those described in the examples).

The term "crystalline block composite" (CBC) refers to composites comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the crystalline block composite and the CAOB of the block copolymer is essentially the same composition as the CAOP of the crystalline block composite.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Ethylene-Based Polymer

An ethylene-based polymer (which may include a combination of one or more ethylene-based polymers) may be present in the hot melt adhesive composition in an amount from 1 wt % to 99 wt %, based on the total weight of the hot melt adhesive composition. According to embodiments, both the ethylene-based polymer and the propylene-based polymer are present in the hot melt adhesive composition to form a polymer component. The amount of the ethylene-based polymer in the polymer component is at least 30 wt %, based on the total weight of the polymer component. For example, the polymer component includes 31 wt % to 90 wt %, 35 wt % to 85 wt %, 40 wt % to 80 wt %, 45 wt % to 75 wt %, and/or 45 wt % to 55 wt % of the ethylene-based polymer, with the remainder being the propylene-based polymer. In embodiments, the ethylene-based polymer may be blended with a propylene-based polymer, e.g., may be blend with the propylene-based polymer before the crystalline block composite compatibilizer is added to the composition. In other embodiments, the ethylene-based polymer, the propylene-based polymer, and the crystalline block composite may be mixed at the same time.

In embodiments, the polymer component is present in an amount from 20 wt % to 95 wt % to form the hot melt adhesive component. When the composition includes a combined total weight of greater than 50 wt % for the tackifier, wax, and/or oil, the amount of the polymer component would be on the lower end of the range such that the amount of the ethylene-based component in the hot melt adhesive composition would be lower.

The density of the ethylene-based polymers may be between 0.850 g/cc and 0.900 g/cc. For example, the density may be from 0.850 g/cc to 0.895 g/cc, 0.860 g/cc to 0.890 g/cc, 0.865 g/cc and 0.885 g/cc, and/or 0.865 g/cc to 0.875 g/cc. Density is determined in accordance with American Society for Testing and Materials (ASTM) procedure ASTM D792-00, Method 13.

The melt index (12) of the ethylene-based polymers may be from 200 grams per ten minutes (g/10 min) to 3,000 g/10 min. For example, the melt index may be at least 500 g/10 min. The maximum melt index may not exceed 2000 g/10 min (e.g., may not exceed 1500 g/10 min and/or may not exceed 1400 g/10 min). In an exemplary embodiment, the melt index is from 750 g/10 min to 1250 g/10 min and/or from 900 g/10 min to 1100 g/10 min. The melt index is measured by ASTM D1238 (Condition E) (190° C./2.16 kg). The ethylene-based polymer may have a Brookfield viscosity of less than 50,000 centipoise (cP) and/or less than 20,000 cP at 350° F./177° C. as measured using a Brookfield viscometer. For example, the Brookfield viscosity may be from 2,000 cP to 15,000 cP and/or from 5,000 cP to 10,000 cP.

The weight average molecular weight (Mw) of the ethylene-based polymers used in may be at least 5,000, at least 10,000, at least 15,000, at least 20,000, at least 25,000, and/or at least 30,000 grams per mole (g/mol). The maximum Mw of the ethylene-based polymers may be less than 100,000 and/or less than 60,000 g/mol. The molecular weight distribution or polydispersity or Mw/Mn of these polymers may be less than 5, between 1 and 5, and/or between 1.5 and 4. Weight average molecular weight (Mw) and number average molecular weight (Mn) are well known in the polymer art and can be determined by know methods.

The ethylene-based polymer may have a crystallinity in the range of from at least 1 percent by weight (a heat of fusion (Hf) of at least 2 Joules/gram (J/g)) to 30 percent by weight (a Hf of less than 50 J/g). For example, the crystallinity range may be from 5% to 25%, from 10% to 20%, and/or from 12% to 18%.

Exemplary ethylene-based polymers may include an ethylene/alpha-olefin interpolymer, which optionally may contain a diene. The ethylene-based polymers are formed without the use of a chain shuttling agent, as discussed below with respect to the crystalline block composite. Such interpolymers include polymers polymerized from at least two different monomers. They include, e.g., copolymers, terpolymers and tetrapolymers. Exemplary, interpolymers are prepared by polymerizing ethylene with at least one comonomer, such as an alpha-olefin (α-olefin) of 3 to 20 carbon atoms ($C_3$-$C_{20}$), 4 to 20 carbon atoms ($C_4$-$C_{20}$), 4 to 12 carbon atoms ($C_4$-$C_{12}$), 4 to 10 carbon atoms ($C_4$-$C_{10}$), and/or 4 to 8 carbon atoms ($C_4$-$C_8$). The alpha-olefins include, but are not limited to, 1-butene, 1-pentene, 1-hexene, 4-methyl-1-pentene, 1-heptene, and 1-octene. In embodiments, alpha-olefins such as 1-butene, 1 pentene, 1-hexene, 4-methyl-1-pentene, 1-heptene, and/or 1-octene are used. The alpha-olefin may be a $C_4$-$C_8$ alpha-olefin.

Exemplary, interpolymers include ethylene/propylene (EP), ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers, and ethylene/propylene/octene terpolymers. In exemplary embodiments, at least one of the EP, EB, EH, and EO copolymers are used in the hot melt adhesive composition.

Exemplary diene monomers include conjugated and nonconjugated dienes. The nonconjugated diolefin can be a $C_5$-$C_{15}$ straight chain, branched chain, or cyclic hydrocarbon diene. Illustrative nonconjugated dienes are straight chain acyclic dienes, such as 1,4-hexadiene and 1,5 heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7 dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene 2 norbornene (ENB), 5-vinyl-2-norbornene, 5 propenyl-2-norbornene, 5 isopropyldene2norbornene, 5-(4-cyclopentenyl)-2-norbornene and 5 cyclohexylidene-2-norbornene. Exemplary nonconjugated dienes include ENB, 1,4-hexadiene, 7 methyl-1,6-octadiene. Suitable conjugated dienes include 1,3 pentadiene, 1,3-butadiene, 2-methyl-1,3-butadiene, 4-methyl-1,3-pentadiene, 1,3 cyclopentadiene.

The ethylene-based polymers used may be substantially free of any diene monomer that typically induces long chain branching (LCB), or the ethylene-based polymers may include such a diene monomer (if costs are acceptable, and desirable interpolymer properties, such as processability, tensile strength and elongation, do not degrade to an unacceptable level). Exemplary diene monomers include, but are not limited to, dicyclopentadiene, NBD, methyl norbornadiene, vinyl-norbornene, 1,6-octadiene, 1,7-octadiene, and 1,9-decadiene. When added, such monomers may be added in an amount within a range from greater than zero to 3 wt %, and/or greater than zero to 2 wt %, based on interpolymer weight.

The ethylene/alpha-olefin interpolymers may be branched and/or unbranched interpolymers. The presence or absence of branching in the ethylene/alpha-olefin interpolymers, and if branching is present, the amount of branching, can vary widely, and may depend on the desired processing conditions and the desired polymer properties. Exemplary types of long chain branching (LCB) in the interpolymers include T-type branching and H-type branching.

T type branching may be obtained by copolymerization of ethylene or other alpha-olefins with chain end unsaturated macromonomers in the presence of a constrained geometry catalyst under the appropriate reactor conditions. The T-type LCB polymers may be produced with constrained geometry catalysts, without measurable gels, but with very high levels of T-type LCB. Because the macromonomer being incorporated into the growing polymer chain has only one reactive unsaturation site, the resulting polymer may contain side chains of varying lengths, and at different intervals along the polymer backbone. If extremely high levels of LCB are desired, H-type branching is the preferred method, since T type branching has a practical upper limit to the degree of LCB. As the level of T-type branching increases, the efficiency or throughput of the manufacturing process decreases significantly, until the point is reached where production may become economically unviable.

H-type branching may be obtained by copolymerization of ethylene or other alpha-olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H type branching may be used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer. Additionally, use of H-type branching agents may deactivate metallocene catalysts, and reduce catalyst efficiency. Thus, when H-type branching agents are used, the catalysts used are typically not metallocene catalysts. The catalysts used to prepare the H-type branched polymers in U.S. Pat. No. 6,372,847 are vanadium type catalysts.

In one embodiment, the ethylene/alpha-olefin interpolymer is a homogeneously branched linear or homogeneously branched substantially linear ethylene/alpha-olefin interpolymer. The terms "homogeneous" and "homogeneously-branched" are used in reference to an ethylene/alpha-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers. Exemplary processes for preparing homogeneous polymers are disclosed in, e.g., U.S. Pat. Nos. 5,206,075 and 5,241,031, and International Publication No. WO 93/03093.

Exemplary ethylene-based polymers include ENGAGE™, AFFINITY™, and NORDEL™ polymers available from The Dow Chemical Company, and VISTALON™ and EXACT™ polymers available from ExxonMobil Chemical Company, and TAFMER™ polymers available from Mitsui Chemical.

Propylene-Based Polymer

The propylene-based polymer (which may include a combination of one or more propylene-based polymers) may be present in the hot melt adhesive composition in an amount from 1 wt % to 99 wt %, based on the total weight of the hot melt adhesive composition. In embodiments, the propylene-based polymer is mixed with the ethylene-based polymer to form the polymer component of the hot melt adhesive. When the composition includes a combined total weight of greater than 50 wt % for the tackifier, wax, and/or oil, the amount of the propylene-based polymer would be on the lower end of the range.

The propylene-based polymer may have a density of 0.910 g/cc or less. For example, the density of the propylene-based copolymer is from 0.850 g/cc to 0.910 g/cc, from 0.870 g/cc to 0.910 g/cc, from 0.870 g/cc to 0.900 g/cc, from 0.860 g/cc to 0.895 g/cc, from 0.870 g/cc to 0.890 g/cc, from 0.875 g/cc to 0.885 g/cc, and/or from 0.875 g/cc to 0.880 g/cc. Density is determined in accordance with American Society for Testing and Materials (ASTM) procedure ASTM D792-00, Method 13. The density of the propylene-based polymer may be greater than (higher than) the density of the ethylene-based polymer in the hot melt adhesive composition.

The propylene-based polymer may have a melt flow rate in the range of from 0.1 to 2000 grams per 10 minutes (g/10 min) as measured in accordance with ASTM D-1238 (at 230° C./2.16 Kg). The melt flow rate may be from a lower limit of 0.1 g/10 min, 0.2 g/10 min, or 0.5 g/10 min to an upper limit of 500 g/10 min, 200 g/10 min, 100 g/10 min, or 50 g/10 min. In exemplary embodiments the melt flow rate is from 1 g/10 min to 200 g/10 min, 1 g/10 min to 100 g/10 min, 1 g/10 min to 75 g/10 min, 1 g/10 min to 50 g/10 min, 1 g/10 min to 40 g/10 min, 1 g/10 min to 35 g/10 min, 10 g/10 min to 30 g/10 min, and/or 20 g/10 min to 30 g/10 min (at 230° C./2.16 Kg).

The propylene-based polymer may have a molecular weight distribution (MWD), defined as weight average molecular weight divided by number average molecular weight (Mw/Mn) of 3.5 or less; or 3.0 or less; or from 1.8 to 3.0.

The propylene-based polymer may have a crystallinity in the range of from at least 1 percent by weight (a heat of fusion (Hf) of at least 2 Joules/gram (J/g)) to 30 percent by weight (a Hf of less than 50 J/g). For example, the crystallinity (for the propylene-based polymer and the ethylene-based polymer) may be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the crystallinity range may be from 5% to 30%, from 10% to 28%, from 15% to 25%, and/or from 20% to 25%. The crystallinity of the propylene-based polymer may be higher than the crystallinity of the ethylene-based polymer. The crystallinity is measured by differential scanning calorimetry (DSC) as described in U.S. Pat. No. 7,199,203. The propylene/alpha-olefin copolymer comprises units derived from propylene and polymeric units derived from one or more alpha-olefin comonomers.

Exemplary propylene-based polymers include propylene homopolymers, propylene interpolymers, reactor copolymers of polypropylene (RCPP), which can contain about 1 to about 20 weight percent ethylene or an alpha-olefin comonomer of 4 to 20 carbon atoms (e.g., $C_2$ and $C_4$-$C_{10}$ alpha-olefins). The propylene-based polymers are formed without the use of a chain shuttling agent, as discussed below with respect to the crystalline block composite. The propylene-based interpolymer can be a random or block copolymer, or a propylene-based terpolymer. Exemplary, comonomers for polymerizing with propylene include ethylene, 1-butene, 1 pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene.

Exemplary propylene-based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene-based polymer include a monomer having at least two double bonds such as dienes or trienes.

The propylene-based polymers may be a propylene-alpha-olefin copolymer, which is characterized as having substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are known in the art and are described in, e.g., U.S. Pat. No. 5,504,172 and International Publication No. WO 00/01745, which refers to the isotactic sequence in terms of a triad unit in the copolymer molecular chain determined by $^{13}C$ NMR spectra.

The propylene-based interpolymers may comprise from 1 to 40 wt % of one or more alpha-olefin comonomers. All individual values and subranges from 1 to 40 wt % are included herein and disclosed herein; e.g., the comonomer content can be from a lower limit of 1 wt %, 3 wt %, 4 wt %, 5 wt %, 7 wt %, or 9 wt % to an upper limit of 40 wt %, 35 wt %, 30 wt %, 27 wt %, 20 wt %, 15 wt %, 12 wt %, or 9 wt %. For example, the propylene/alpha-olefin copolymer comprises from 1 to 35 wt %, 1 to 30 wt %, 3 to 27 wt %, 3 to 20 wt %, and/or 3 to 15 wt % of one or more alpha-olefin comonomers.

In one embodiment, the propylene/alpha-olefin polymers are further characterized as comprising (A) between 60 and less than 100, between 80 and 99, and/or more between 85 and 99, weight percent units derived from propylene, and (B) between greater than zero and 40, between 1 and 20, between 4 and 16, and/or between 4 and 15, weight percent units derived from at least one of ethylene and/or a $C_{4-10}$ α-olefin.

Similarly as discussed with respect to the ethylene-based polymers, the propylene-based polymers may contain LCB. For example, the propylene-based polymer may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length.

Exemplary propylene-based polymers are commercially available from The Dow Chemical Company, under the trade name VERSIFY™, or from ExxonMobil Chemical Company, under the trade name VISTAMAXX™.

Crystalline Block Composite

The amount of crystalline block composite in the HMA composition is from 5 wt % to 60 wt %, from 10 wt % to 40 wt %, from 15 wt % to 30 wt %, and/or from 20 wt % to 30 wt %, based on the total weight of the HMA composition.

The crystalline block composite (CBC) includes the crystalline ethylene based polymer (CEP), the crystalline alpha-olefin based polymer (CAOP), and the block copolymer having a crystalline ethylene block (CEB) and the crystalline alpha-olefin block (CAOB), wherein the CEB is essentially the same composition as the CEP and the CAOB is essentially the same composition as the CAOP. In the crystalline block composite, the alpha olefin is at least one selected from the group of $C_{3-10}$ α-olefins (e.g., may be propylene and/or butylene) and comprises at least 90 wt % of the CAOB. In exemplary embodiments, the CAOP includes propylene, e.g., at least 90 wt % or more units of propylene and any remainder may be ethylene and/or at least one of selected from the group of $C_{4-10}$ α-olefins. Further, when the CAOB includes propylene, as does the CAOP. The compositional split between the amount of CEP and CAOP will be essentially the same as that between the corresponding blocks in the block copolymer. The CEB and the CAOB may be referred to as hard segments/blocks.

In exemplary embodiments, the CAOB refers to highly crystalline blocks of polymerized alpha olefin units in which the monomer that is one of $C_{3-10}$ α-olefins is present in an amount greater than 93 wt %, greater than 95 wt %, and/or greater than 96 wt %. In other words, the comonomer content in the CAOBs is less than less than 7 wt %, less than 5 wt %, and/or less than 4 wt %. CAOBs with propylene crystallinity have corresponding melting points that are 80° C. and above, 100° C. and above, 115° C. and above, and/or 120° C. and above. In some embodiments, the CAOB comprise all or substantially all propylene units. CEB refers to blocks of polymerized ethylene units in which the comonomer content (such as propylene) is 10 wt % or less, between 0 wt % and 10 wt %, between 0 wt % and 7 wt %, and/or between 0 wt % and 5 wt %. Such CEBs have corresponding melting points that are preferably 75° C. and above, 90° C. and above, and/or 100° C. and above.

Described into another way, the CAOB may refer to highly crystalline blocks of polymerized alpha olefin units in which the monomer that is one of $C_{3-10}$ α-olefins is present in an amount greater than 90 mol %, greater than 93 mol %, greater than 95 mol %, and/or greater than 96 mol %. In other words, the comonomer content in the CAOBs is less than 10 mol %, less than 7 mol %, less than 5 mol %, and/or less than 4 mol %. CEB refers to blocks of polymerized ethylene units in which the comonomer content (such as propylene) is 10 mol % or less, between 0 mol % and 10 mol %, between 0 mol % and 7 mol %, and/or between 0 mol % and 5 mol %.

Crystalline block composites may be differentiated from conventional, random copolymers, physical blends of polymers, and block copolymers prepared via sequential monomer addition. The crystalline block composites may be differentiated from random copolymers and from a physical blend by characteristics such as crystalline block composite index, better tensile strength, improved fracture strength, finer morphology, improved optics, and/or greater impact strength at lower temperature. The crystalline block composites may be differentiated from block copolymers prepared by sequential monomer addition by molecular weight distribution, rheology, shear thinning, rheology ratio, and block polydispersity. A unique feature of crystalline block composites is that they cannot be fractionated by conventional means by solvent or temperature such as xylene fractionation, solvent/non-solvent, or temperature rising elution fractionation or crystallization elution fractionation since the individual blocks of the block copolymer are crystalline.

When produced in a continuous process, the crystalline block composites desirably possess PDI from 1.7 to 15 (e.g., from 1.8 to 10, from 2.0 to 5, and/or from 3.0 to 3.5). Such crystalline block composites are described in, e.g., US Patent Application Publication Nos. 2011-0313106, 2011-0313108, and 2011-0313108, all published on Dec. 22, 2011, incorporated herein by reference with respect to descriptions of the crystalline block composites, processes to make them, and methods of analyzing them. In exemplary embodiments, the crystalline block composite may have a molecular weight distribution (MWD), defined as weight average molecular weight divided by number average molecular weight (Mw/Mn) of 5.0 or less, 4.0 or less, from 2.0 to 4.0, from 3.0 to 4.0, and/or from 3.0 to 3.5.

The alpha-olefin of the crystalline block composite polymers may be propylene, 1-butene, or 4-methyl-1-pentene and one or more comonomers. For example, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional exemplary comonomers are selected from diolefins, cyclic olefins, and cyclic diolefins, halogenated vinyl compounds, and vinylidene aromatic compounds. In an exemplary embodiment, the monomer is propylene and the comonomer is ethylene.

Comonomer content in the crystalline block composite polymers may be measured using a Crystalline Block Composite Index (CBCI) determination discussed in the Examples. The CBCI for the crystalline block composite is greater than 0 and less than 1.0. For example, the CBCI is from 0.2 to 0.99, from 0.3 to 0.99, from 0.4 to 0.99, from 0.5 to 0.99, from 0.6 to 0.99, from 0.6 to 0.80, and/or from 0.7 to 0.70. For example, the crystalline block composite polymers comprise from 0.5 to 95 wt % CEP, from 0.5 to 95 wt % CAOP, and from 5 to 99 wt % block copolymer. For example, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP, and from 50 to 99 wt % block copolymer. Weight percents are based on total weight of crystalline block composite. The sum of the weight percents of CEP, CAOP, and block copolymer equals 100%.

The crystalline block composite may have, a Tm greater than 90° C. (e.g., for both a first peak and a second peak), a Tm greater than 100° C. (e.g., for both a first peak and a second peak), and/or greater than 120° C. (e.g., for at least one of a first peak and a second peak). For example, the Tm is in the range of from 100° C. to 250° C., from 110° C. to 220° C., and/or from 115° C. to 220° C. According to an exemplary embodiment, the crystalline block composite exhibits a second peak Tm in a range from 100° C. to 130° C. (e.g., 100° C. to 120° C., 100° C. to 110° C., etc.) and a first peak Tm in a range from 110° C. to 150° C. (e.g., 110° C. to 140° C., 115° C. to 130° C., 115° C. to 125° C., etc.), in which the second peak Tm is less than the first peak Tm.

The crystalline block composite may have a weight average molecular weight (Mw) from 10,000 g/mol to 2,500,000 g/mol, from 35000 g/mol to 1,000,000 g/mol, from 50,000 g/mol to 300,000 g/mol, and/or from 50,000 g/mol to 200,000 g/mol. For example, the Mw may be from 20 kg/mol to 1000 kg/mol, from 50 kg/mol to 500 kg/mol, and/or from 80 kg/mol to 125 kg/mol.

The MFR (melt flow rate) of the block composites and crystalline block composites may be from 0.1 to 1000 dg/min (230° C./2.16 kg), from 1 to 500 dg/min (230° C./2.16 kg), from 3 to 30 dg/min (230° C./2.16 kg), and/or from 5 to 10 dg/min (230° C./2.16 kg).

The crystalline block composite polymers may be prepared by a process comprising contacting an addition polymerizable monomer or mixture of monomers under addition polymerization conditions with a composition comprising at least one addition polymerization catalyst, at least one cocatalyst, and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term, "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the block composites and crystalline block composites comprise a fraction of block polymer which possesses a most probable distribution of block lengths.

Suitable processes useful in producing the block composites and crystalline block composites may be found, for example, in U.S. Patent Application Publication No. 2008/0269412, published on Oct. 30, 2008. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having the crystalline ethylene block (CEB) and the crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It may be more advantageous to produce CEB in the first reactor or zone with fresh chain shuttling agent added. The presence of increased levels of ethylene in the reactor or zone producing CEB may lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. A more preferable approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Exemplary catalysts and catalyst precursors for use to from the crystalline block composite include metal complexes such as disclosed in WO2005/090426. Other exemplary catalysts are also disclosed in US Patent Publication No. 2006/0199930, US 2007/0167578, and US 2008/0311812; U.S. Pat. No. 7,355,089; and International Publication No. WO 2009/012215.

Tackifiers

The HMA compositions optionally include a tackifier. The tackifier may have a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the HMA composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. In those embodiments in which a tackifier is present, the amount of tackifier in the HMA composition can be from greater than zero, or 1 wt %, or 5 wt %, or 10 wt %, or 15 wt %, or 20 wt % or 25 wt %, or 30 wt % to 35 wt %, or 40 wt %, or 45 wt %, or 50 wt %, or 55 wt %, or 60 wt %, or 65 wt % up to 70 wt % of the total weight of the HMA composition. The amount of the tackifier is from 0 wt % to 70 wt % (e.g., from 5 wt % to 60 wt %, from 10 wt % to 50 wt %, from 15 wt % to 40 wt %, etc.).

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term. Useful examples include EASTOTAC™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. EASTOTAC™ H-142R from Eastman Chemical Co. has a softening point of about 140° C. Other useful tackifying resins include ESCOREZ™ 5300, 5400, and 5637, partially hydrogenated aliphatic petroleum hydrocarbon resins, and ESCOREZ™ 5600, a partially hydrogenated aromatic modified petroleum hydrocarbon resin all available from Exxon Chemical Co. in Houston, Tex.; WINGTACK™. Extra, which is an aliphatic, aromatic petroleum hydrocarbon resin available from Goodyear Chemical Co. in Akron, Ohio; HERCOLITE™ 2100, a partially hydrogenated cycloaliphatic petroleum hydrocarbon resin available from Hercules, Inc. in Wilmington, Del.; NORSOLENE™ hydrocarbon resins from Cray Valley; and ARKON™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment the tackifying agent is free of groups with which the silanol group of either the silane-grafted amorphous polyalpha-olefin or the silane-grafted ethylene/α-olefin multi-block copolymer will react.

Wax and/or Oil

The HMA compositions optionally include at least one selected from the group of a wax and/or oil. The wax and/or oil may be used to reduce the melt viscosity of the HMA composition. The oil may also be a plasticizer. Non-limiting examples of waxes include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes, fatty amide waxes, and homogeneous waxes. Waxes may be usefully employed in the HMA compositions, e.g., when the adhesive composition is intended to be relatively tack free upon cooling and solidifying, such as for various packaging and bookbinding applications.

Non-limiting examples of oils include mineral based oils, petroleum based oils, functionalized oils such as glycerol trihydroxyoleate, vegetable oils, fatty oils, other plasticizing oils known in the art, and mixtures thereof. Exemplary oils are hydrocarbon oils that are low in aromatic content and are paraffinic or naphthenic in character.

The amount of the wax and/or oil is from greater than zero, or 1 wt %, or 5 wt %, or 10 wt %, or 15 wt %, or 20 wt %, or 25 wt %, or 30 wt % and up to 40 wt % of the total weight of the HMA composition. The amount of wax and/or in the present HMA composition can be from 0 wt % to 40 wt %. For example, the amount of wax and/or oil is from 1 wt % to 30 wt %, from 5 wt % to 30 wt %, from 15 wt % to 25 wt %, etc., of the total weight of the HMA composition.

Additives and Fillers

The HMA compositions can optionally include one or more additives and/or fillers (different and separate from the tackifier, wax, and oil). Nonlimiting examples of additives include plasticizers, thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, nucleating agents, flame retardants and combinations thereof. Nonlimiting examples of fillers include fumed silica, precipitated silica, talc, calcium carbonates, carbon black, aluminosilicates, clay, zeolites, ceramics, mica, titanium dioxide, and combinations thereof. The type and amount of additives and/or filler is selected to maximize the manufacture, storage, use, and/or economics of the HMA composition. Nonlimiting examples of nucleating agents include, 3:2,4-di-p-methyl-dibenzilidene sorbitol.

For example, the HMA compositions may include an antioxidant, in which antioxidant refers to types or classes of chemical compounds that are capable of being used to minimize the oxidation that can occur during the processing of polymers. The term also includes chemical derivatives of the antioxidants, including hydrocarbyls. The term further includes chemical compounds, as described later in the description of the antioxidant, that when properly combined with the coupling agent (modifying agent) interact with to form a complex which exhibits a modified Raman spectra compared to the coupling agent or modifying agent alone. The amount of the antioxidant may be less than 1 wt %, based on the total weight of the HMA composition.

The HMA composition may include a plasticizer (e.g., that is the same as or different from an oil). The plasticizer may be an organic composition that can be added to improve extrudability, flexibility, workability, and/or stretchability. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils, which are low in aromatic content and which are paraffinic or napthenic in character. Plasticizer oils may be low in volatility, may be transparent, and may have as little color and odor as possible. Other exemplary plasticizers include olefin oligomers, low molecular weight polymers, vegetable oils and their derivatives, and similar plasticizing liquids.

HMA Compositions

The hot melt adhesive (HMA) compositions include at least the polymer component including an ethylene-based polymer and a propylene-based polymer and the crystalline block composite. The polymer component is present in an amount from 20 wt % to 95 wt %, based on the total weight of the HMA composition. The crystalline block component is present in an amount from 1 wt % to 60 wt %, based on the total weight of the HMA composition. In exemplary embodiments, the polymer component combined with the crystalline block component is present in an amount from 30 wt % to 80 wt %, from 30 wt % to 70 wt %, from 30 wt % to 60 wt %, and/or from 35 wt % to 45 wt %, based on the total weight of the HMA composition.

The HMA composition may include from 0 to 70 wt % of at least one tackifier, based on the total weight of the HMA composition. For example, the amount of the tackifier (when included) may be from 5 wt % to 70 wt %, from 10 wt % to 50 wt %, from 20 wt % to 40 wt %, and/or from 30 wt % to 40 wt %, based on the total weight of the HMA composition. In an exemplary embodiment, the HMA composition includes from 30 wt % to 40 wt % of a tackifying resin. The HMA composition may include from 0 to 40 wt % of a wax and/or oil (such a combined weight of wax and/or oil is from 0 to 40 wt %). For example, the amount of the wax and/or (when included) may be from 5 wt % to 40 wt %, from 10 wt % to 35 wt %, from 15 wt % to 30 wt %, and/or from 20 wt % to 30 wt %, based on the total weight of the HMA composition. In an exemplary embodiment, the HMA composition includes from 20 wt % to 30 wt % of a wax. The HMA composition may include from 0 wt % to 5 wt % of other additives, such as an antioxidant. For example, the HMA composition may include from 0.1 wt % to 2 wt % of an antioxidant.

The HMAs are adhesives that are applied as a melt onto the parts to be adhesively bonded and cure as they cool and solidify. The HMA compositions may exclude a solvent so as to be a non-solved based adhesive. The HMA compositions may be block composite based high melt viscosity and high melt flow index adhesive compositions.

The HMA compositions according to embodiments may be used in packaging and/or bookbinding applications. In particular, the HMA compositions according to embodiment may be are relatively tack-free upon cooling and exhibit better heat stress and cohesion at elevated temperatures, so as to be well suited for such packaging and bookbinding applications. Other potential applications of the HMA compositions according to embodiments, include but are not limited to, any adhesive application pertaining to bonding a paper substrate selected from the group of Kraft paper, coated paper, highly filled paper, laminated paper, etc., to any other paper substrate and/or polymeric film substrate (e.g., when applied by extrusion or lamination by roll coaters).

The HMA compositions are compounded and used in the same manner as known HMA compositions. Compounding of the composition can be effected by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The components are mixed at a temperature and for a length of time sufficient to fully homogenize the mixture. The type of mixer utilized, and the operating conditions of the mixer, will affect properties of the composition such as viscosity, volume resistivity, and extruded surface smoothness.

The present HMA composition is useful for bonding various substrates. One embodiment includes an article that has a first substrate, a second substrate, and an adhesive layer between and in contact with the first substrate and the second substrate. The adhesive layer includes the present HMA composition. The HMA composition may be any HMA composition as described above.

The first substrate may be the same material as the second substrate. Alternatively, the second substrate is a different material than the first substrate. Nonlimiting examples of suitable materials for the first substrate and the second substrate include metal (steel, aluminum) metal foil, wood, glass, polymeric material (such as polyolefin, acrylonitrile butadiene styrene (ABS), thermoplastic, elastomer, polycarbonate, polyurethane), polyvinyl chloride, foam/foam laminate, fabric (woven, non-woven, natural, synthetic), textile, paper, and any combination thereof. In some embodiment, the first substrate includes a rigid material and the second substrate includes a flexible material. A "rigid material" is a material that resists deformation in response to an applied force. As used herein, a "flexible material" is a material that has less resistance to deformation than the aforementioned rigid material. In other words, the flexible material exhibits greater pliability or flexibility compared to the rigid material.

In an exemplary embodiment, the first substrate includes a rigid material and the second substrate includes a rigid material. In another exemplary embodiment, the first substrate includes a rigid material and the second substrate includes a flexible material. In another exemplary embodiment, the first substrate includes a flexible material and the second substrate includes a flexible material.

EXAMPLES

Test Methods

Density is measured in accordance with ASTM D-792. The result is reported in gamma (g) per cubic centimeter, or g/cc.

Melt index ($I_2$) is measured in accordance with ASTM D-1238 (190° C.; 2.16 kg). The result is reported in grams/10 minutes. Melt flow rate (MFR) is measured in accordance with ASTM D-1238 (230° C.; 2.16 kg). The result is reported in grams/10 minutes.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 m columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene}=a*(M\text{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

Differential Scanning Calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) (Tm) of each polymer is determined from the second heat curve (peak Tm), and the crystallization temperature (Tc) is determined from the first cooling curve (peak Tc).

High Temperature Thermal Gradient Interaction Chromatography measurement uses a commercial Crystallization Elution Fractionation instrument (CEF) (Polymer Char, Spain) is used to perform high temperature thermal gradient interaction chromatography (HT-TGIC, or TGIC) measurement (Cong, et al., Macromolecules, 2011, 44 (8), 3062-3072). A single Hypercarb column (100×4.6 mm, Part#35005-104646, Thermo Scientific) is used for separation. A "¼ inch×³⁄₁₆ inch ID" stainless steel column with a length of 3 inches packed with 27 micron glass beads (Catalog# GL01918/20-27 um, MO-SCI Specialty Products, LLC, Rolla, Mo., USA), is installed in front of the IR detector, in the top oven of the CEF instrument. The experimental parameters are: top oven/transfer line/needle temperature at 150° C., dissolution temperature at 160° C., dissolution stirring setting of 2, sample loading volume of 0.400 mL, pump stabilization time of 15 seconds, a pump flow rate of cleaning column at 0.500 mL/m, pump flow rate of column loading at 0.300 ml/min, stabilization temperature at 150° C., stabilization time (pre, prior to load to column) at 3.0 min, stabilization time (post, after loaded to column) at 1.0 min, SF (Soluble Fraction) time at 5.0 min, cooling rate of 3.00° C./min from 150° C. to 30° C., flow rate during cooling process of 0.00 ml/min, heating rate of 2.00° C./min from 30° C. to 150° C., isothermal time at 150° C. for 15 min, elution flow rate of 0.500 mL/min, and an injection loop size of 140 microliters.

The flow rate during cooling process can be adjusted according to the length of graphite column where all the polymer fractions must remain on the column at the end of cooling cycle.

Samples are prepared by the PolymerChar autosampler at 160° C., for 120 minutes, at a concentration of 4.0 mg/ml in ODCB (defined below). Silica gel 40 (particle size 0.2-0.5 mm, catalogue number 10181-3, EMD) is dried in a vacuum oven at 160° C., for about two hours, prior to use. 2,6-di-tert-butyl-4-methylphenol (1.6 grams, BHT, catalog number B1378-500G, Sigma-Aldrich) and the silica gel 40 (5.0 grams) are added to two liters of ortho-dichlorobenze (ODCB, 99% anhydrous grade, Sigma-Aldrich). This "ODCB containing BHT and silica gel" is now referred to as "ODCB." This ODCB is sparged with dried nitrogen ($N_2$) for one hour prior to use.

The TGIC data is processed on a PolymerChar (Spain) "GPC One" software platform. The temperature calibration is performed with a mixture of about 4 to 6 mg Eicosane, 14.0 mg of isotactic homopolymer polypropylene iPP (polydispersity of 3.6 to 4.0, and molecular weight Mw reported as polyethylene equivalent of 150,000 to 190,000 Daltons, and polydispersity (Mw/Mn) of 3.6 to 4.0, and a DSC melting temperature at 158-159 C with the specified method below), and 14.0 mg of homopolymer polyethylene HDPE (zero comonomer content, Mw reported as polyethylene equivalent as 115,000 to 125,000 Daltons, and polydispersity of 2.5 to 2.8), in a 10 mL vial filled with 7.0 mL of ODCB. The dissolution time is 2 hours at 160° C.

The calibration process (30° C. to 150° C. for Eicosane elution and HDPE elution) consists of the following steps:

(1) Extrapolate the eluting temperature for each of the isothermal steps during elution according to heating rate.

(2) Calculate the delay volume: Shift the temperature (x-axis) corresponding to the IR measurement channel chromatogram (y-axis), so that the Eicosane peak maximum (y-axis) is coincident with elution temperature at 30.0° C. The delay volume is calculated from the temperature difference (30° C.—the actual elution temperature of Eicosane peak maximum) divided by the heating rate of the method, and then multiplied by the elution flow rate.

(3) Adjust each recorded elution temperature with this same delay volume adjustment.

(4) Linearly scale the heating rate, such that the observed HDPE reference has an elution peak maximum temperature of 150.0° C., while the Eicosane elution peak maximum temperature remains at 30.0° C.

(5) The peak temperature of the polypropylene will be observed within the range of 119.3-120.2° C., which is a validation of the calibration method.

Data processing for polymer samples of TGIC is described below.

A solvent blank (ODCB from solvent reservoir) is run at the same experimental conditions as the polymer samples. Data processing for polymer samples includes: subtraction of the solvent blank for each detector channel, temperature extrapolation as described in the calibration process, compensation of temperature with the delay volume determined from the calibration process, and adjustment in elution temperature axis to the 30° C. and 150° C. range as calculated from the heating rate of the calibration.

The chromatogram (measurement channel of IR-4 detector) is integrated with PolymerChar "GPC One" software. A straight baseline is drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit is established based on the visible difference when the peak falls to the flat baseline region (roughly a zero value in the blank subtracted chromatogram). The lower temperature integration limit is established based on the intersection point of the baseline with the chromatogram including the soluble fraction.

The soluble fraction (SF) is defined as the weight percentage of the material eluting including and below 34.0° C.

$$\text{Materials eluting as soluble fraction \%} = 100 \times \frac{\int_{\text{lower temperature intergation limit}}^{34.0} IR - 4dT}{\int_{\text{lower temperature intergation limit}}^{\text{Upper temperature intergation limit}} IR - 4dT}$$

High Temperature Liquid Chromatography is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. For example, HTLC may be performed according to the methods disclosed in US Patent Application Publication No. 2010-0093964 and U.S. patent application Ser. No. 12/643,111, filed Dec. 21, 2009. Samples are analyzed by the methodology described below. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Van der Horst, A.; Schoenmakers, P. J. *J. Chromatogra. A* 2003, 1000, 693). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC

Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;

From 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC

The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit i adjusted to repeat the process.

Each SEC chromatogram n from 1 to 217 yields an X-Y pair in the HTLC chromatogram, where n is the fraction number:

$X_n$=elution volume(mL)=D1flow rate×n×$t_{switch}$ where $t_{switch}$=3 min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume.

X-Y pairs of data are also obtained from $IR_{methyl}$ and LS15 signals. The ratio of $IR_{methyl}/IR_{measure}$ is used to calculate composition after calibration. The ratio of LS15/$IR_{measure}$ is used to calculate weight-average molecular weight (Mw) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental LS15/$IR_{measure}$ ratio is then converted to $M_w$ through $\Omega$.

By way of example, three HTLC chromatograms are shown in FIG. 9. The black chromatogram is for Comparative BCN1 (i.e., CBCN1). The red chromatogram is for the blend of iPP and TAFMER™ P-0280 (an ethylene/alpha-olefin copolymer product available from Mitsui Chemicals). The blue chromatogram is for the blend of VERSIFY™ 2400 (a propylene-ethylene copolymer available from The Dow Chemical Company) and TAFMER™ P-0280. The dashed line is a linear regression fit of the chemical compositions of iPP, VERSIFY™ 2400, and TAFMER™ P-0280 versus their peak elution volumes. Note that VERSIFY™ 2400 has two peaks. The composition and elution volume of the main peak is used for the linear fit. The three polymers all have $M_w$ above 80,000 Daltons.

Melt viscosity is determined by ASTM D-3236 using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch wide, 5 inches long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The results are reported in milliPascal-second, or mPa-s.

Tensile Properties is measured using ASTM D-638, which covers the determination of the tensile properties of plastics in the form of standard dumbbell-shaped test specimens when tested under defined conditions of pretreatment, temperature, humidity, and testing machine speed. At least five specimens for each sample is tested in the case of isotropic materials. Condition all the test specimens in accordance with Procedure A of Practice D618, Conduct the tests at the same temperature and humidity used for conditioning. Sample dimensions are then measured using a caliper. A testing machine (such as INSTRON™) is used to detect stress as a function of elongation by placing the specimen in the grips of the testing machine, taking care to align the long axis of the specimen with the grips. Modulus of materials is determined from the slope of the linear portion of the stress-strain curve which is determined using a Class B-2 or better extensometer. For most plastics, this linear portion is very small, occurs very rapidly, and must be recorded automatically. Tensile Strength is calculated by dividing the maximum load in newtons (pounds-force) by the average original cross-sectional area in the gage length segment of the specimen in square meters (square inches). Percent Elongation at Break is calculated by reading the extension (change in gage length) at the point of specimen rupture. Divide that extension by the original gage length and multiply by 100.

Tensile at Break is measured in accordance with ASTM D-638. Elongation at Break is measured in accordance with ASTM D-638.

Polypropylene equivalent molecular weight calculations are performed using Viscotek TriSEC software Version 3.0.

Shear Adhesion Failure Temperature (SAFT) is measured according to ASTM D-4498 with a 500 gram weight in the shear mode. The tests are started at room temperature (25° C./77° F.) and the oven temperature is ramped at an average rate of 0.5° C./minute. The temperature at which the specimen failed is recorded.

Peel Adhesion Failure Temperature (PAFT) is tested according to ASTM D 4498 with a 100 gram weight in the peel mode. The tests are started at room temperature (25° C./77° F.) and the temperature is increased at an average rate of 0.5° C./minute.

Samples for SAFT and PAFT testing are prepared using two sheets of 40 pound Kraft paper, each of about 6×12 in (152×305 mm) dimensions. On the bottom sheet, lengthwise and separated by a gap of 1 in (25 mm), are adhered in parallel fashion two 1.75 or 2 in (45 or 51 mm) wide strips of a one sided, pressure-sensitive tape such as masking tape. The adhesive sample to be tested is heated to 177° C. (350° F.) and is drizzled in an even manner down the center of the gap formed between the tape strips. Then before the adhesive can unduly thicken two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the adhesive in the gap between the tape strips and the second rod evenly compress the second sheet over the top of the gap and on top of the tape strips. Thus a single 1 inch wide strip of sample adhesive is created, between the two tape strips, and bonding the paper sheets. The sheets so bonded are cut crosswise into strips of width 1 inch and length of about 3 inches, each strip having a 1×1 in (25×25 mm) adhesive sample bond in the center. The strips may then be employed in the SAFT or PAFT, as desired.

Percent Fiber Tear (FT) Fiber Tear Regular Cardboard Substrate Percent, of HMA using Inland corrugated cardboard is determined according to a standardized method. A bead of adhesive is applied on to a cardboard coupon (5×6 cm) using an OLINGER Bond Tester and a second coupon is quickly placed on top of the adhesive. Light finger pressure for about 3 seconds is applied to hold the bond in place. Samples are conditioned for at least 4 hours at room temperature (23° C.) and 50% relative humidity. Next, samples are conditioned at the test temperatures for 5 hours to 24 hours. Samples (n=5) are pulled apart by hand and the failure mode (fiber tear, cohesive failure, adhesive failure) is recorded.

Gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,* 6, 621 (1968)): $M_{polypropylene} = 0.645(M_{polystyrene})$.

Materials for Composite Formation

Catalyst ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR® E) obtainable from ExxonMobil Chemical Company and purified through beds of 13-X molecular sieves prior to use.

Crystalline Block Composite 1 (CBC1 in Table 1, below) is each prepared using two continuous stirred tank reactors (CSTR) connected in series (in a solution pilot facility). Each reactor is hydraulically full and set to operate at steady state conditions. Monomers, Solvent, Catalyst, Cocatalyst-1, Cocatalyst-2, and CSA-1 are flowed to the first reactor according to the process conditions outlined in Table 1. Then, the first reactor contents as described in Table 1 are flowed to a second reactor in series. Additional Catalyst, Cocatalyst-1, and Cocatalyst-2 are added to the second reactor.

TABLE 1

Process Conditions for Producing CBC

| Condition | 1st Reactor | 2nd reactor |
| --- | --- | --- |
| Reactor Control Temp. (° C.) | 130.0 | 115.2 |
| Solvent Feed (lb/hr) | 228.0 | 184.6 |
| Propylene Feed (lb/hr) | 32.9 | — |
| Ethylene Feed (lb/hr) | 3.35 | — |
| Reactor Propylene Conc. (g/L) | 3.74 | 0.54 |
| Hydrogen Feed (SCCM) | 9.65 | 9.34 |
| Catalyst Flow (lb/hr) | 0.68 | 0.38 |
| Catalyst Conc. (ppm) | 59.9 | 385.0 |
| Cocatalyst-1 Flow (lb/hr) | 0.91 | 0.20 |
| Cocatalyst-1 Conc. (ppm) | 559.6 | 6000 |
| Cocatalyst-2 Flow (lb/hr) | 0.57 | — |
| Cocatalyst-2 Conc. (ppm) | 3995 | — |
| DEZ Flow (lb/hr) | 1.24 | — |
| DEZ Concentration (ppm) | 50000 | — |

With respect to CBC the Crystalline Block Composite Index (CBCI) is measured to be 0.634 based on the method shown in Table 2, below. In particular, CBCI provides an estimate of the quantity of block copolymer within the crystalline block composite under the assumption that the ratio of CEB to CAOB within the diblock is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight % propylene present in each of the fractions that are separated by HTLC.

CBCI is calculated based on the following:

TABLE 2

Crystalline Block Composite Index (CBCI) Determination

| Line # | Variable | Source | CBC1 |
|---|---|---|---|
| 1 | Overall wt % C3 Total | Measured | 52.600 |
| 2 | wt % C3 in PP block/polymer | Measured | 99.000 |
| 3 | wt % C3 in PE block/polymer | Measured | 10.500 |
| 4 | wt fraction PP (in block or polymer) | Eq. 2 below | 0.476 |
| 5 | wt fraction PE (in block or polymer) | 1-Line 4 | 0.524 |
| | Analysis of HTLC Separation | | |
| 6 | wt fraction isolated PP | Measured | 0.174 |
| 7 | wt fraction PE fraction | Measured | 0.826 |
| 8 | wt % C3 in PE-fraction | Eq. 4 below | 42.826 |
| 9 | wt fraction PP-diblock in PE fraction | Eq. 6 below | 0.365 |
| 10 | wt fraction PE in PE fraction | 1-Line 10 | 0.635 |
| 11 | wt fraction Diblock in PE fraction | 10/Line 4 | 0.768 |
| | Crystalline Block Composite Index (CBCI) | | |
| 12 | | Eq. 7 below | 0.634 |

Referring to Table 2, above, crystalline block composite index (CBCI) is measured by first determining a summation of the weight % propylene from each component in the polymer according to equation 1, below, which results in the overall weight % propylene/C3 (of the whole polymer). This mass balance equation can be used to quantify the amount of the iPP and PE present in the diblock copolymer. This mass balance equation can also be used to quantify the amount of iPP and PE in a binary blend or extended to a ternary, or n-component blend. For the CBCs, the overall amount of iPP or PE is contained within the blocks present in the diblock and the unbound iPP and PE polymers.

$$\text{Wt \% } C3_{Overall} = w_{PP}(\text{wt \% } C3_{PP}) + w_{PE}(\text{wt \% } C3_{PE}) \quad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block Note that the overall weight % of propylene (C3) is measured from C13 NMR or some other composition measurement that represents the total amount of C3 present in the whole polymer. The weight % propylene in the iPP block (wt % $C3_{PP}$) is set to 100 or if otherwise known from its DSC melting point, NMR measurement, or other composition estimate, that value can be put into its place. Similarly, the weight % propylene in the PE block (wt % $C_3PE$) is set to 100 or if otherwise known from its DSC melting point, NMR measurement, or other composition estimate, that value can be put into its place.

Calculating the Ratio of PP to PE in the Crystalline Block Composite:

Based on equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{wt\% C3_{Overall} - wt\% C3_{PE}}{wt\% C3_{PP} - wt\% C3_{PE}} \quad \text{Eq. 2}$$

where
$w_{PP}$=weight fraction of PP present in the whole polymer
wt % $C3_{PP}$=weight percent of propylene in PP component or block
wt % $C3_{PE}$=weight percent of propylene in PE component or block To estimate the amount of the Diblock in the Crystalline Block Composite, apply equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$wt\% C3_{Overall} = w_{PPisolated}(wt\% C3_{PP}) + w_{PE-fraction}(wt\% C3_{PE-fraction}) \quad \text{Eq. 3}$$

$$wt\% C3_{PE-fraction} = \frac{wt\% C3_{Overall} - w_{PPisolated}(wt\% C3_{PP})}{w_{PE-fraction}} \quad \text{Eq. 4}$$

$$w_{PE-fraction} = 1 - w_{PPisolated} \quad \text{Eq. 5}$$

where
$W_{PPisolated}$=weight fraction of isolated PP from HTLC
$W_{PE-fraction}$=weight fraction of PE separated from HTLC, containing the diblock and unbound PE wt % C3$_{PP}$=weight % of propylene in the PP; which is also the same amount of propylene present in the PP block and in the unbound PP wt % C3$_{PE-fraction}$=weight % of propylene in the PE-fraction that was separated by HTLC wt % C3$_{Overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{wt\%C3_{PE-fraction} - wt\%C3_{PE}}{wt\%C3_{PP} - wt\%C3_{PE}} \quad \text{Eq. 6}$$

Where wt % C3$_{PE-fraction}$=weight % of propylene in the PE-fraction that was separated by HTLC (Equation 4)

wt % C3$_{PP}$=weight % of propylene in the PP component or block (defined previously)

wt % C3$_{PE}$=weight % of propylene in the PE component or block (defined previously)

w$_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock (w$_{PP-diblock}$) multiplied by two. Another way to calculate this is by dividing the weight fraction of PP in the diblock (w$_{PP-diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction} \quad \text{Eq. 7}$$

Where w$_{PP-diblock}$=weight fraction of PP in the diblock separated with the PE-fraction by HTLC (Equation 6)

w$_{PP}$=weight fraction of PP in the polymer w$_{PE-fraction}$=weight fraction of PE separated from HTLC, containing the diblock and unbound PE (Equation 5)

Referring to Table 3, below, the resultant CBC has the following properties:

TABLE 3

| | Properties of CBC | | | | | | | |
|---|---|---|---|---|---|---|---|---|
| Ex. | wt % PP from HTLC Separation | Mw Kg/mol | Mw/Mn | wt % C$_2$ | Tm (° C.) Peak 1 (Peak 2) | Tc (° C.) | Melt Enthalpy (J/g) | Tg (° C.) |
| CBC | 17.5 | 91.6 | 3.3 | 47.7 | 120 (106) | 85.9 | 89.5 | −18.5 |

The CBC is a crystalline polyethylene/polypropylene (EP) and crystalline polypropylene (PP) diblock copolymer having 10.5 wt % propylene in the crystalline EP and 99 wt % propylene in the PP block.

Further with respect to the CBCI, the resultant CBC has the following properties:

TABLE 4

| | Properties of CBC | | |
|---|---|---|---|
| Sample | wt % fraction PP | wt % fraction EP | Crystalline Block Composite Index |
| CBC | 52 | 48 | 0.634 |

Blend Compositions

AFFINITY™ GA 1900 is an ethylene-based polymer having typical properties of a density of 0.870 g/cc, a Brookfield Viscosity (at 177° C.) of 8,200 cP, a melt index of 1,000 g/10 min (190° C./2.16 kg), a crystallinity of 15.8% ([heat of fusion in J/g]/[292 J/g]), a DSC melting point of 68° C., a glass transition temperature of −58° C., and a melt temperature of 68° C. (available from The Dow Chemical Company).

VERSIFY™ 4200 is a propylene-based polymer having typical properties of a density of 0.876 g/cc, a melt flow rate of 25 g/10 min (230° C./2.16 kg), a crystallinity of 29% ([heat of fusion in J/g]/[292 J/g]), a Shore A hardness of 94 (ASTM D-2240), and a glass transition temperature of −26° C. (available from The Dow Chemical Company)

Exemplary blends are shown in Table 5, below. Working Examples 1 to 4 include CBC, an ethylene-based polymer, and a propylene-based polymer (whereas the ethylene-based polymer is present in an amount greater than 30 wt % based on the total weight of the ethylene-based polymer and the propylene-based polymer). Comparative Examples A to C exclude CBC and/or a propylene-based polymer. Comparative Examples D and E include 30 wt % of the ethylene-based polymer.

TABLE 5

| Blend Ratio | 0 wt % CBC | 5 wt % CBC | 10 wt % CBC |
|---|---|---|---|
| AFFINITY ™/VERSIFY ™ (70%/30%) | Comp. Ex. A | Working Ex. 1 | Working Ex. 3 |
| AFFINITY ™/VERSIFY ™ (50%/50%) | Comp. Ex. B | Working Ex. 2 | Working Ex. 4 |
| AFFINITY ™/VERSIFY ™ (30%/70%) | Comp. Ex. C | Comp. Ex. D | Comp. Ex. E |

Figure 2:
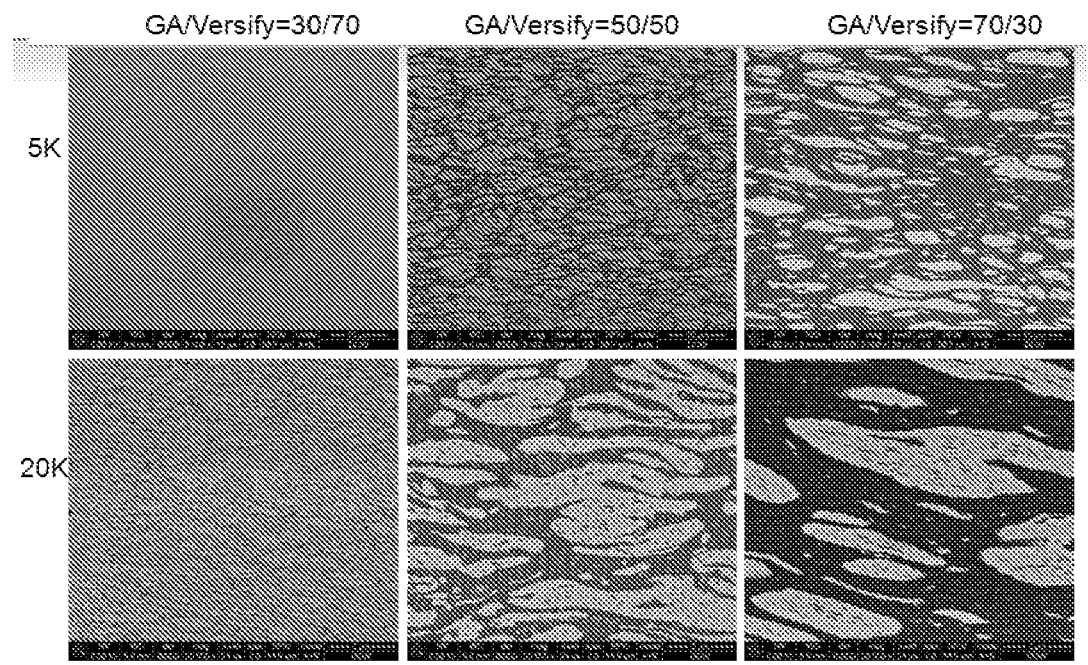
FIG. 2 is a set of six SEM images of the cross section of inventive examples having an ethylene-based polymer and propylene-based polymer blend that includes 5 wt % of a crystalline block composite compatibilizer.
Figure 3:
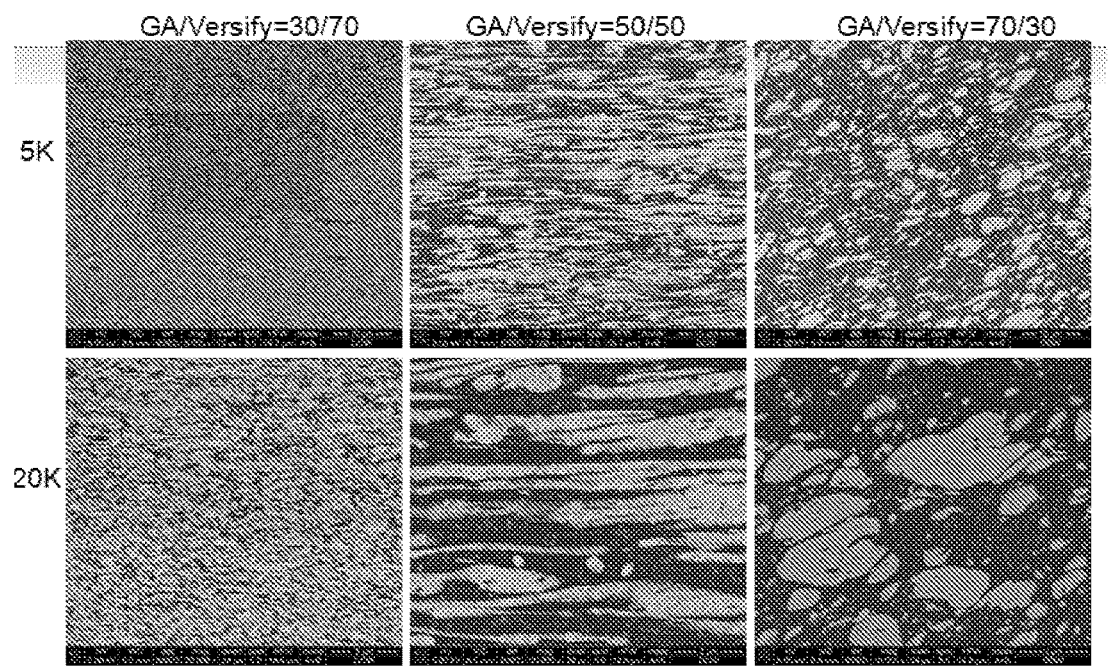
FIG. 3 is a set of six SEM images of the cross section of inventive examples having an ethylene-based polymer and propylene-based polymer blend that includes 10 wt % of a crystalline block composite compatibilizer.

Referring to FIGS. 1, 2, and 3, by incorporating CBC (5% and 10%) into the blends, the compatibility between the ethylene-based AFFINITY™ GA and propylene-based VERSIFY™ improves. This is observed by the finer dispersion of the ethylene-based elastomer and propylene-based elastomer in the presence of the CBC. Better dispersion and compatibility is desirable because it may lead to more homogeneous and stable adhesive formulations for both the melt state processing and solid state properties and/or stable adhesive formulations with consistent viscosities during application and consistent adhesion, tensile, heat resistance, and flexural properties.

Tensile stress at break and tensile strain at break are measured according to ASTM D-638, based on the Working Examples and Comparative Examples in Table 5. Referring to Table 6, below, improvement in both tensile stress and tensile strain is seen when CBC is included and the amount of the ethylene-based polymer is greater than 30 wt %, based on the total weight of a mixture of the ethylene-based polymer and the propylene-based polymer.

TABLE 6

| AFFINITY ™/VERSIFY ™ (70/30) | 0 wt % CBC | 5 wt % CBC | 10 wt % CBC |
|---|---|---|---|
| Tensile stress at break (MPa) | 1.5 | 2.0 | 2.3 |
| Tensile strain at Break (%) | 32 | 53 | 56 |
| AFFINITY ™/VERSIFY ™ (50/50) | 0 wt % CBC | 5 wt % CBC | 10 wt % CBC |
| Tensile stress at break (MPa) | 2.0 | 2.9 | 3.0 |
| Tensile strain at Break (%) | 225 | 489 | 454 |

TABLE 6-continued

| AFFINITY ™/VERSIFY ™ (30/70) | 0 wt % CBC | 5 wt % CBC | 10 wt % CBC |
|---|---|---|---|
| Tensile stress at break (MPa) | 16.1 | 15.7 | 15.53 |
| Tensile strain at Break (%) | 973 | 1058 | 1054 |

Referring to Table 6, incorporating CBC into the blends can further improve mechanical properties up to 50% on tensile strength and 100% on elongation as the result of increased compatibility between the ethylene and propylene elastomer phases.

Figure 4A:
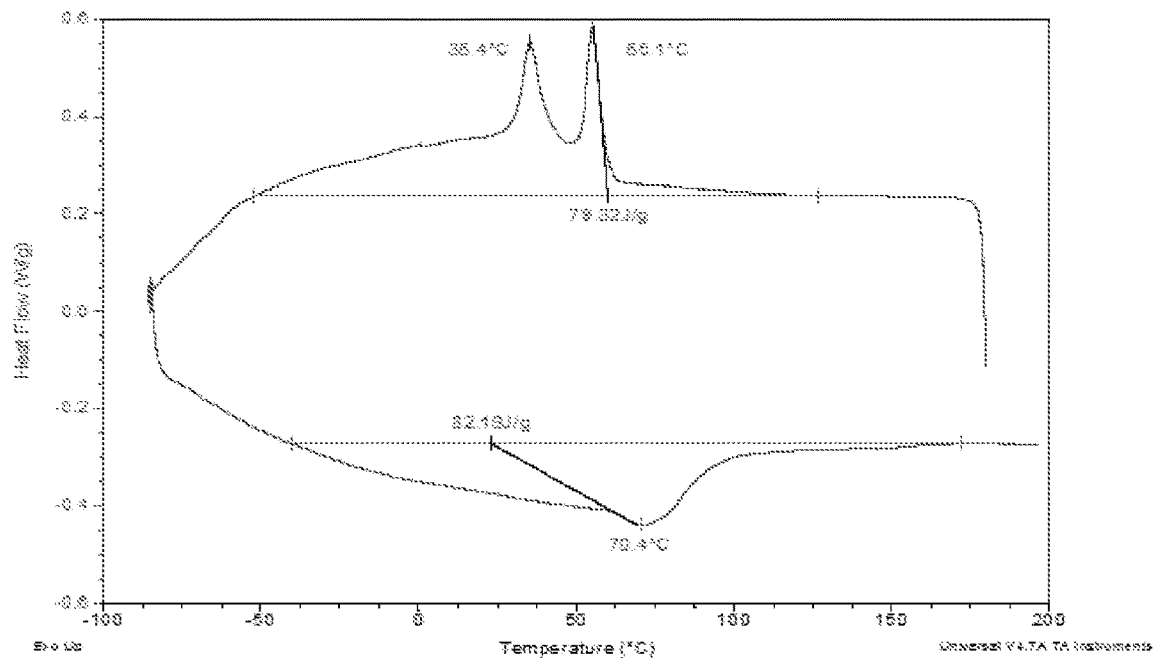
FIGS. 4A-4C is a set of three DSC melting and crystallization profiles of an ethylene-based polymer and propylene-based polymer blend that includes 0, 5, and 10 wt % of crystalline block composite compatibilizer, respectively.
Figure 4B:
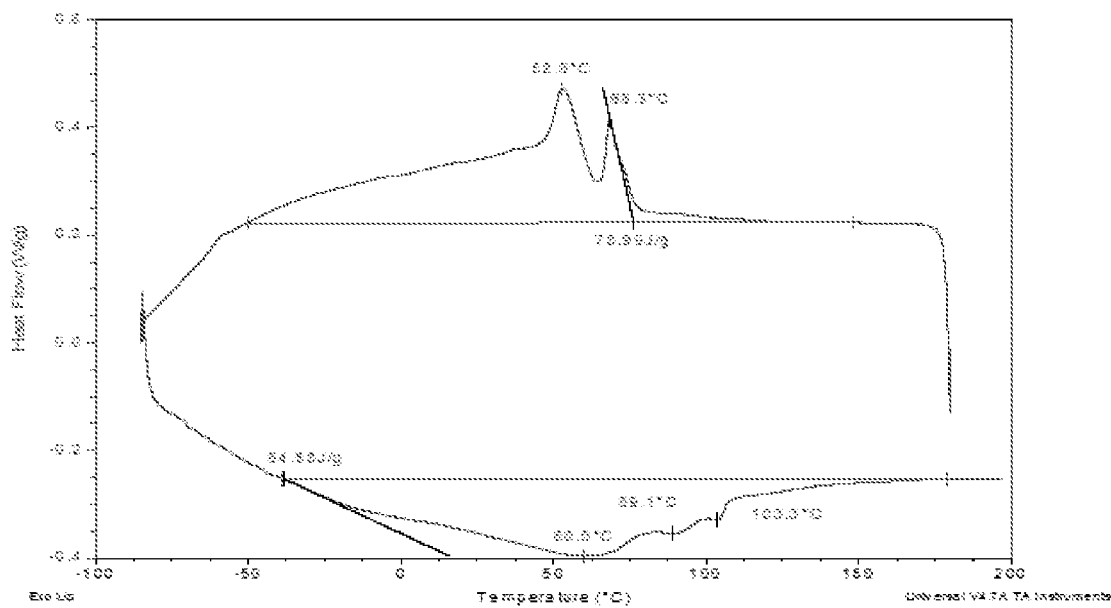
Figure 4C:
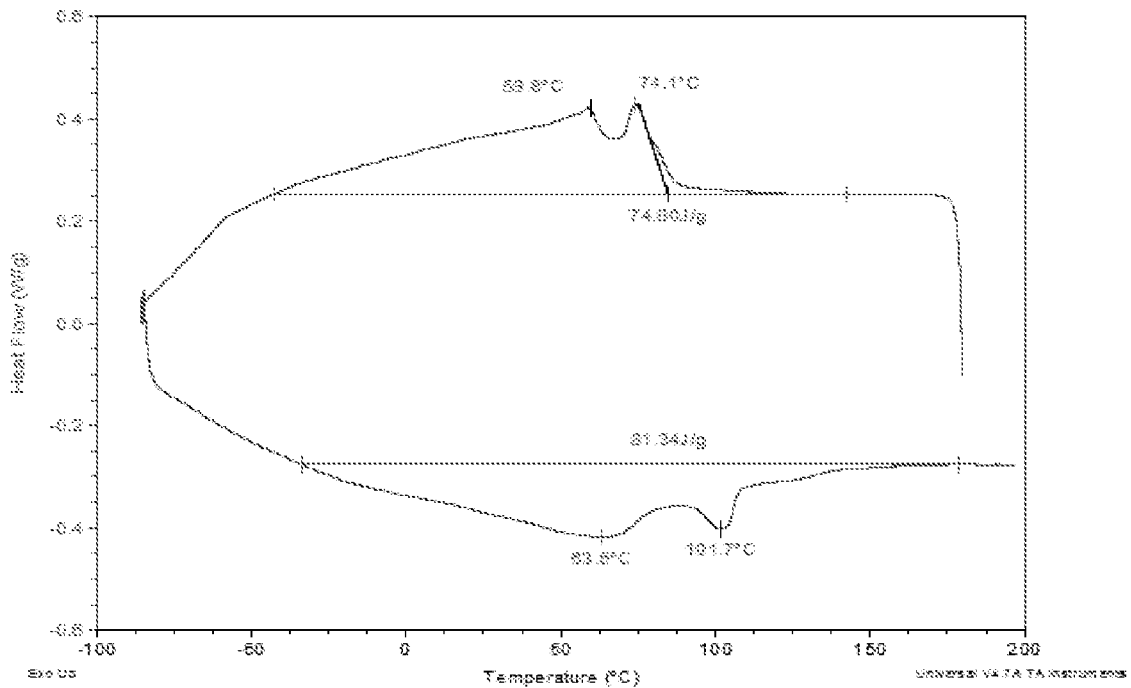

Referring to FIG. 4, the examples include CBC also demonstrate a change in the melt and crystallization profiles. In particular, FIG. 4 compares differential scanning calorimetry (DSC) melting profiles of 50/50 wt % of AFFINITY™ GA 1900 and VERSIFY™ 4200 blends with 0 wt %, 5 wt %, and 10 wt %. As shown, the CBC increases the crystallization temperatures. Such an increase in crystallization may lead to faster setup and shortening of the open time for an adhesive, which is a desirable improvement to low crystallinity polymers, especially propylene-ethylene elastomers which are slow to crystallize. This improvement may allow for better sprayability and/or fiber formation for adhesive application in hot melt packaging.

Hot Melt Adhesive Compositions

ENGAGE™ 8402 is an ethylene-octene copolymer, having a density of 0.902 g/cc, a melt index of 30 g/10 min (190° C./2.16 kg)(available from The Dow Chemical Company).

Polypropylene homopolymer (hPP) used has a density of 0.90 g/cc and an MFR of 35 g/10 min (230° C./2.16 kg) (available from The Dow Chemical Company).

Eastotac™ H-115R is a hydrogenated hydrocarbon tackifying resin (available from Eastman).

Sasolwax H1 is a wax (available from SASOL).

Irganox® 1010 (AO1) is pentaerythritol tetrakis(3-(3,5-di-tert-butyl-4-hydroxyphenyl)propionate) based antioxidant (available from BASF Chemical).

The following hot melt adhesive blends include a total of 40 wt % of a polymer portion (which includes various combinations CBC, AFFINITY™ GA 1900 as an ethylene-based polymer, VERSIFY™ 4200 as a propylene-based polymer, and/or a combination of ENGAGE™ 8402 and hPP as a comparative), 35 wt % of Eastotac™ H-115R tackifying resin, 24.5 wt % of Sasolwax H1 wax, and 0.5 wt % ppm AO1.

TABLE 7

Adhesive Blends

| | Viscosity @ 177° C. (cP) | Tensile at Break (MPa) | Elongation at Break (%) | SAFT (° C.) | PAFT (° C.) | Fiber Tear (%) | | |
|---|---|---|---|---|---|---|---|---|
| | | | | | | −17° C. | RT | 60° C. |
| Working Ex. 5 | 2269 | 1.8 | 275 | 108 | 67 | 100 | 100 | 100 |
| Comparative Ex. F | 2068 | 1.2 | 109 | 105 | 66 | 100 | 100 | 84 |
| Comparative Ex. G | 2118 | 1.2 | 125 | 96 | 51 | 83 | 100 | 75 |
| Comparative Ex. H | 593 | 1.1 | 82 | 93 | 57 | 75 | 100 | 67 |

(i) Working Example 5 includes 5 wt % of CBC, 28 wt % of AFFINITY™ GA 1900, and 7 wt % of VERSIFY™ 4200. (ii) Comparative F includes 2.5 wt % of an ENGAGE™ 8402 copolymer and 2.5 wt % of hPP [instead of the CBC], 28 wt % of AFFINITY™ GA 1900, and 7 wt % of VERSIFY™ 4200. (iii) Comparative Example G includes 28 wt % of AFFINITY™ GA 1900 and 12 wt % of VERSIFY™ 4200 [excludes any CBC]. (iv) Comparative Example H includes 40 wt % of AFFINITY™ GA 1900.

SAFT refers to the sheer adhesion fail temperature test described above under Test Methods. PAFT refers to the peel adhesion fail temperature test described above under Test Methods. Fiber Tear references to the Fiber Tear Regular Cardboard Substrate Percent test described above under Test Methods. The Fiber Tear test is performed at three different temperatures, −17° C., room temperature (approximately 20-23° C.), and 60° C.

Referring to Table 7, the addition of 5% CBC to the AFFINITY™ GA 1900/VERSIFY™ 4200 blend in Working Example 5 significantly improves the adhesive performance, i.e., tensile, elongation, SAFT, PAFT, and/or fiber tear in comparison to Comparative Examples G to H. Further, Working Example 5, exhibits good performance with respect to fiber tear across a large temperature range, even at the high temperature of 60° C. and low temperature of −17° C. Accordingly, CBC improves the compatibility between the ethylene-based polymers such as AFFINITY™ GA 1900 and propylene-based polymers such as VERSIFY™ 4200 in hot melt adhesive compositions.

The invention claimed is:

1. A hot melt adhesive composition, comprising:
   (A) less than 50 wt % of a polymer component including an ethylene-based polymer and a propylene-based polymer, the ethylene-based polymer being present in an amount greater than 30 wt %, based on a total weight of the polymer component; and
   (B) from 1 to less than 60 wt % of a crystalline block composite comprising:
      (1) a crystalline ethylene based polymer;
      (2) a crystalline alpha-olefin based polymer derived from at least one of a $C_{3-10}$ α-olefin; and
      (3) a block copolymer comprising 10-90 wt % of a crystalline ethylene block comprising polymerized ethylene units in which a comonomer content is 10 mol % or less, and comprising 10-90 wt % of a crystalline alpha-olefin block comprising greater than 90 mol % units derived from at least one of a $C_{3-10}$ α-olefin;
   (C) from 20 to 40 wt % of a tackifier; and
   (D) from 15 to 30 wt % of at least one selected from the group of a wax and an oil,
   wherein the ethylene-based polymer has a Brookfield viscosity of less than 50,000 centipoise (cP) at 177° C., and
   wherein a combined weight of the polymer component and the crystalline block composite is from 30 to 60 wt %, based on a total weight of the hot melt adhesive composition.

2. The hot melt adhesive composition as claimed in claim 1, wherein the crystalline alpha-olefin based polymer and the crystalline alpha-olefin block are derived from propylene.

3. The hot melt adhesive composition as claimed in claim 1, wherein the Crystalline Block Composite Index of the crystalline block composite is greater than 0.2 and less than 1.0.

4. The hot melt adhesive composition as claimed in claim 1, wherein the crystalline block composite is a polyethylene-isotactic polypropylene (PE-iPP) diblock polymer.

5. The hot melt adhesive composition as claimed in claim 1, wherein the ethylene-based polymer has a density from 0.860 g/cc to 0.890 g/cc and a melt index from 200 g/10 min to 3,000 g/10 min.

6. The hot melt adhesive composition as claimed in claim 5, wherein propylene-based polymer has a density from 0.870 g/cc to 0.910 g/cc and a melt flow rate from 1 g/10 min to 200 g/10 min, the density of the propylene-based polymer being higher than the density of the ethylene-based polymer.

7. The hot melt adhesive composition as claimed in claim 1, wherein the amount of the ethylene-based polymer is from 40 wt % to 60 wt %, based on the total weight of the polymer component.

8. A packaging adhesive comprising the hot melt adhesive composition as claimed in claim 1.

9. A bookbinding adhesive comprising the hot melt adhesive composition as claimed in claim 1.

10. An article comprising, a first substrate, a second substrate, and an adhesive layer between and in contact with the first substrate and the second substrate, the first substrate including a rigid material, the second substrate including a flexible material that has less resistance to deformation than the rigid material, and the adhesive layer including the hot melt adhesive composition as claimed in claim 1.

11. An article comprising, a first substrate, a second substrate, and an adhesive layer between and in contact with the first substrate and the second substrate, the first substrate including a rigid material, the second substrate including a rigid material, and the adhesive layer including the hot melt adhesive composition as claimed in claim 1.

12. An article comprising, a first substrate, a second substrate, and an adhesive layer between and in contact with the first substrate and the second substrate, the first substrate including a flexible material, the second substrate including a flexible material, and the adhesive layer including the hot melt adhesive composition as claimed in claim 1.

13. An article comprising, a first substrate, a second substrate, and an adhesive layer between and in contact with the first substrate and the second substrate, the first substrate being wood, the second substrate being wood, and the adhesive layer including the hot melt adhesive composition as claimed in claim 1.

14. An article comprising, a first substrate, a second substrate, and an adhesive layer between and in contact with the first substrate and the second substrate, the first substrate being non-woven fabric, and the adhesive layer including the hot melt adhesive composition as claimed in claim 1.

* * * * *